US012687713B2

(12) United States Patent
Laslandes et al.

(10) Patent No.: US 12,687,713 B2
(45) Date of Patent: Jul. 21, 2026

(54) ADAPTIVE OPTICAL DEVICE AND ASSOCIATED MANUFACTURING PROCESS

(71) Applicant: ALPAO, Montbonnot-Saint-Martin (FR)

(72) Inventors: Marie Emilie Laslandes, Gieres (FR);
Damien Stefanuto, Le Versoud (FR)

(73) Assignee: ALPAO, Montbonnot-Saint-Martin (FR)

( * ) Notice: Subject to any disclaimer, the term of this patent is extended or adjusted under 35 U.S.C. 154(b) by 357 days.

(21) Appl. No.: 18/279,810

(22) PCT Filed: Mar. 3, 2022

(86) PCT No.: PCT/FR2022/050382
§ 371 (c)(1),
(2) Date: Aug. 31, 2023

(87) PCT Pub. No.: WO2022/185013
PCT Pub. Date: Sep. 9, 2022

(65) Prior Publication Data
US 2024/0160008 A1 May 16, 2024

(30) Foreign Application Priority Data
Mar. 3, 2021 (FR) ...................................... 2102081

(51) Int. Cl.
*G02B 26/08* (2006.01)

(52) U.S. Cl.
CPC ................................ *G02B 26/0825* (2013.01)

(58) Field of Classification Search
CPC .... G02B 26/06; G02B 26/08; G02B 26/0825;
G02B 26/0841; G02B 5/10; G02B 19/00;
(Continued)

(56) References Cited

U.S. PATENT DOCUMENTS

| | | | |
|---|---|---|---|
| 4,655,563 A | 4/1987 | Plante et al. | |
| 6,236,490 B1 | 5/2001 | Shen | |
| 2006/0104596 A1* | 5/2006 | Askins | G02B 26/0825 |
| | | | 385/147 |

FOREIGN PATENT DOCUMENTS

EP 3203299 A1 8/2017

OTHER PUBLICATIONS

G.R. Lemaitre; Astronomical Optics and Elasticity Theory, Astronomy and Astrophysics Library, DOI 10.1007/978-3-540-68905-8_7; Springer-Verlag Berlin Heidelberg 2009.

* cited by examiner

*Primary Examiner* — Jie Lei
(74) *Attorney, Agent, or Firm* — Nath, Goldberg & Meyer; Joshua B. Goldberg

(57) ABSTRACT

Improved adaptive optical device and associated manufacturing process. The invention relates to an adaptive optical system comprising: a deformable primary plate having an optical surface for deforming an incident wavefront, a plurality of primary actuators for applying a force to said primary plate in order to deform said optical surface, a structure that is fixed with respect to said primary plate, the device also comprising: a deformable secondary plate bearing the primary actuators, a secondary actuator, connected to the structure, and designed to exert, on said secondary plate, a force in an actuation secondary direction in order to deform it, said secondary direction and said secondary plate being secant. The invention is particularly suitable for rapidly and precisely change, with various amplitudes, the curvature of an optical surface intended to modify an incident wavefront within an optical system.

17 Claims, 5 Drawing Sheets

(58) Field of Classification Search
CPC ............ G02B 19/0023; G02B 19/0076; G02B
19/0042; G02B 7/183; G02B 7/1815;
G02B 23/20; G02B 23/06; G02B 27/62
USPC .... 359/200.7, 845–847, 849, 862, 868, 291,
359/399
See application file for complete search history.

[Fig. 1]
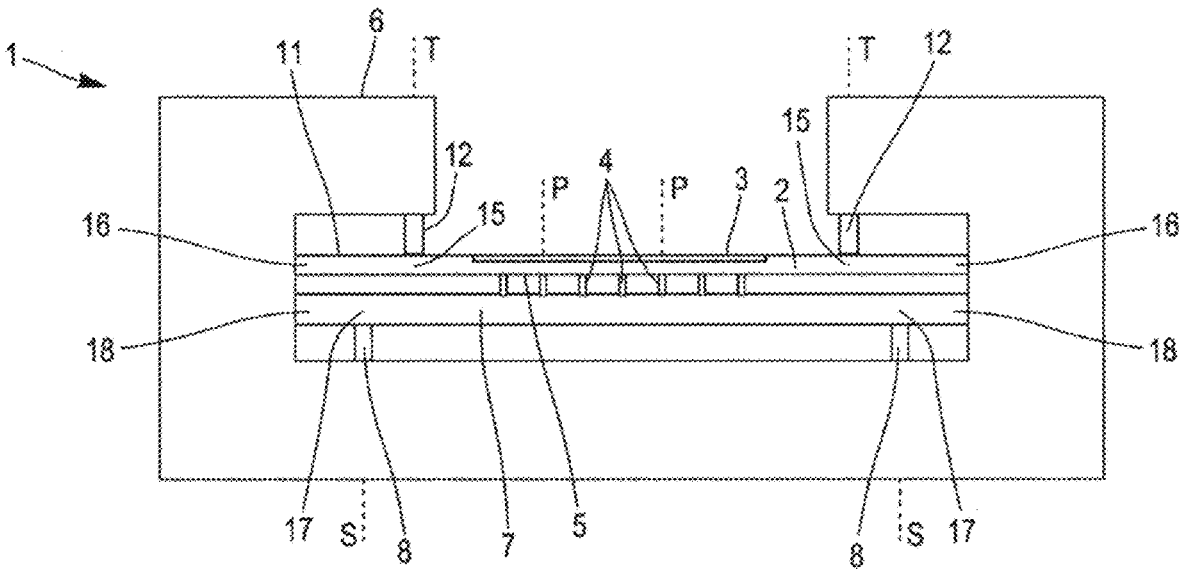

[Fig. 2]
[Fig. 3]
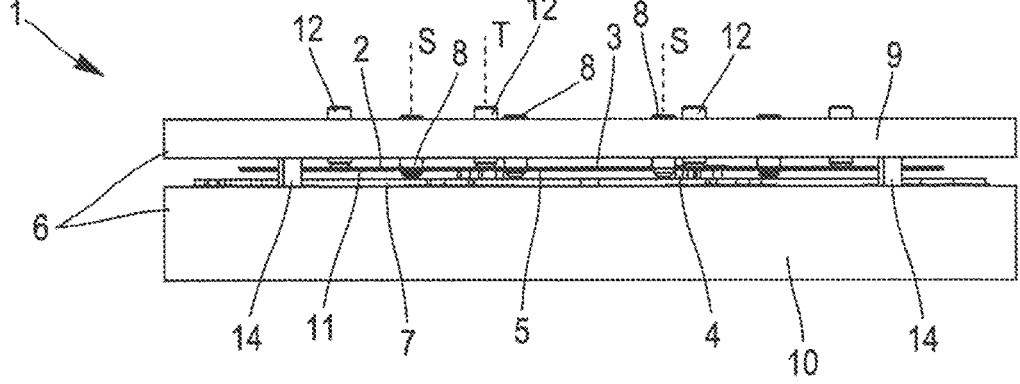

[Fig. 4]
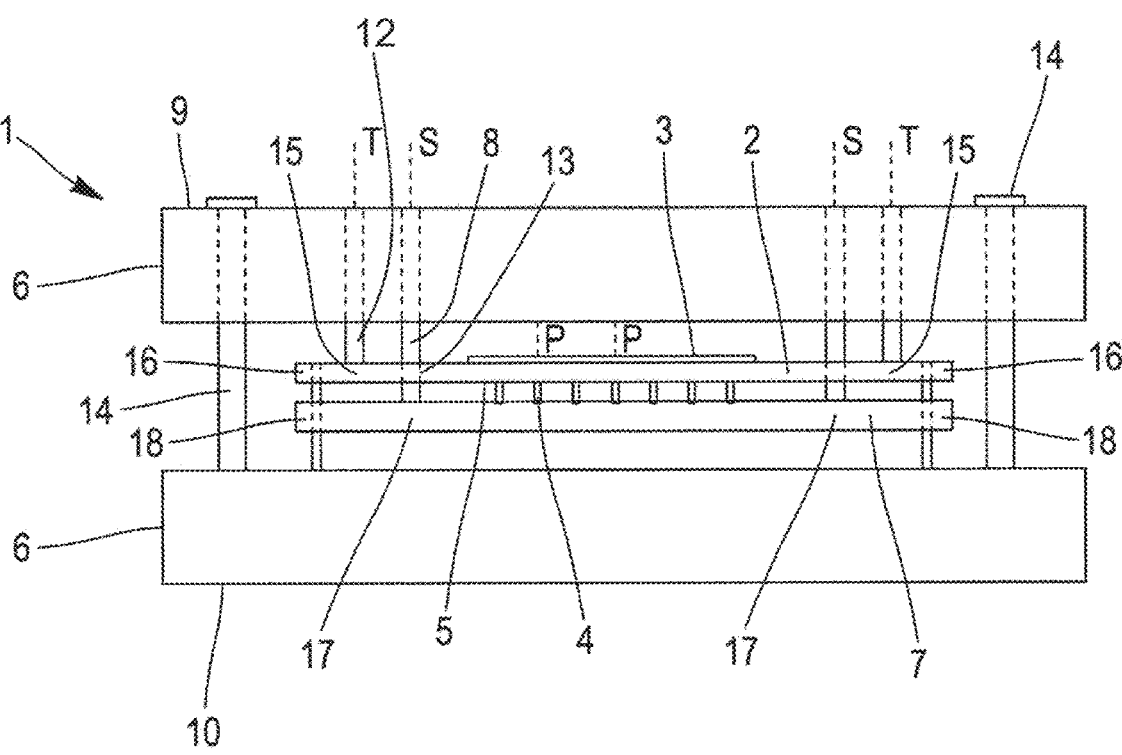
[Fig. 5]
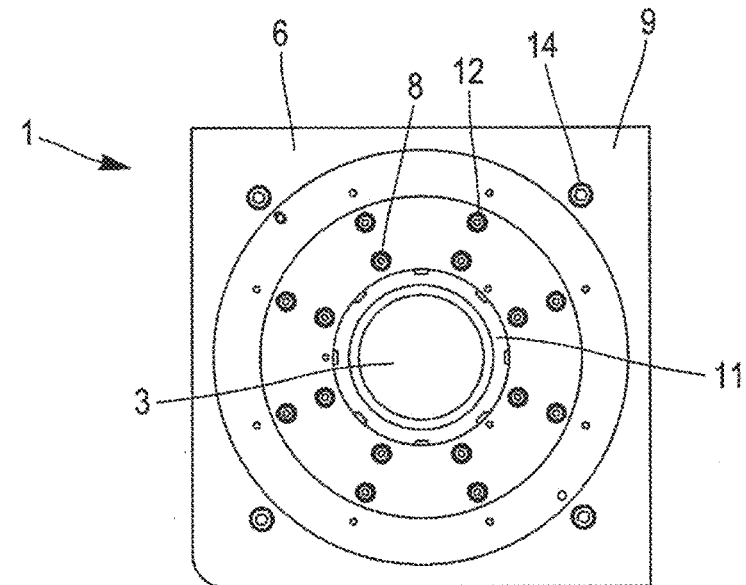

[Fig. 6]
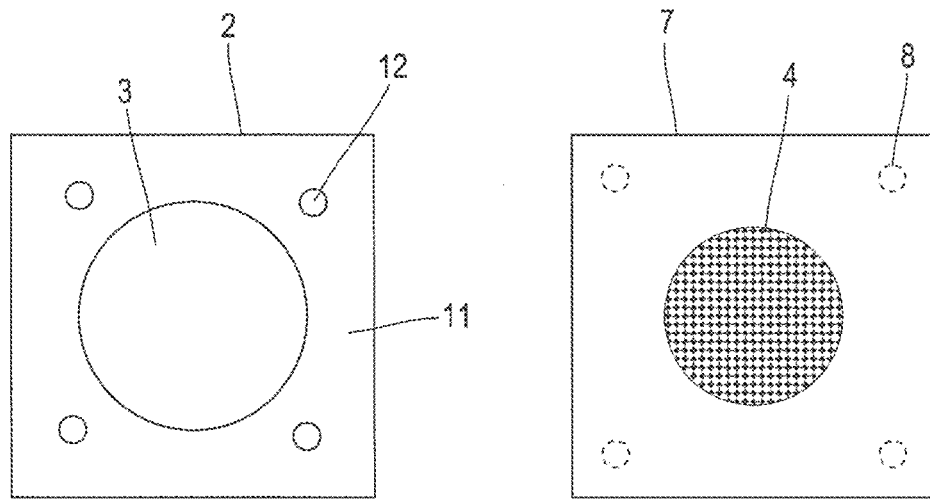
[Fig. 7]
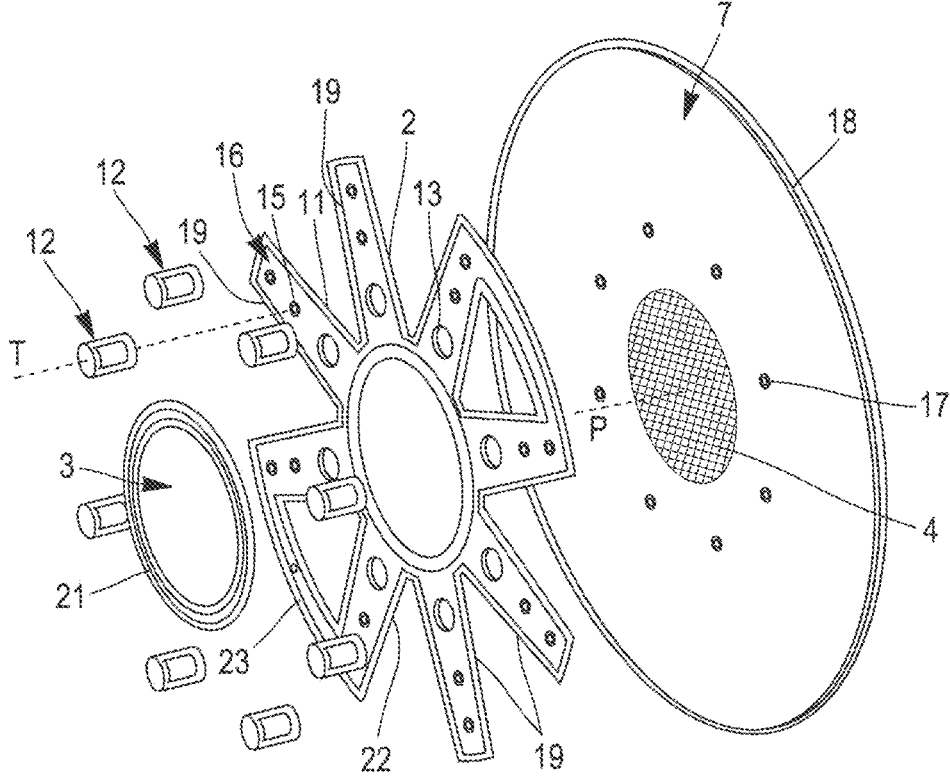

[Fig. 8]

ADAPTIVE OPTICAL DEVICE AND ASSOCIATED MANUFACTURING PROCESS

This is a National Phase Application filed under 35 U.S.C. 371 as a national stage of PCT/FR2022/050382, filed Mar. 3, 2022, an application claiming the benefit of French Application No. 2102081, filed Mar. 3, 2021, the content of each of which is hereby incorporated by reference in its entirety.

TECHNICAL FIELD

The present invention relates to the general technical field of adaptive optics, and more particularly to the controlled deformation of incident wavefront for various applications such as astronomy, optics, medicine, in particular ophthalmology, telecommunications, for example by means of wireless optics, laser use, microscopy, optical fibres, microelectronics, this list being by no means exhaustive.

The invention more particularly relates to an adaptive optical device comprising at least:
- a deformable primary plate, which has an optical surface intended for deforming an incident wavefront by refraction and/or reflection,
- a plurality of primary actuators, designed to each apply a respective force to said deformable primary plate in order to deform said optical surface,
- and a frame that is fixed with respect to said deformable primary plate.

The present invention also relates to a method for manufacturing such an adaptive optical device.

PRIOR ART

It is known to use active, i.e. adaptive, optical devices, e.g. deformable mirrors for the controlled generation or correction of optical aberrations, such as astigmatism, in an incident wavefront. The known conventional deformable mirrors generally comprise a deformable plate having on one side a reflective face, intended to reflect the incident wavefront, and on the other side, a hidden face, opposite to the reflective face. These known mirrors further comprise several actuators exerting punctual forces on the hidden face, each actuator thus locally deforming the curvature of the reflective face, in a controlled manner.

While these known deformable mirrors are generally satisfactory, they do have their limitations depending on the intended uses, and could be further improved.

Indeed, in some cases, it is desirable to change the curvature of the deformable plate, and more precisely of the reflective face thereof, over part or even the totality of the latter, in order in particular to increase the radius of curvature, on the contrary generate flatness or improve the latter, possibly reverse the direction of curvature, or change the curvature nature, for example in order to obtain an off-axis optical system. To change the general curvature of the reflective face or a substantial part of the latter, it is required, with the known mirrors, to make an adjustment of several of the actuators, or even all of them. Now, this adjustment is particularly complex and increases the risk of individual error of one actuator or even several of them (human error, machine error, breakdown, etc.), which could deform the desired reflection of the wavefront on the mirror. Moreover, this adjustment is also long to make, due to the fact that several or even all the actuators exerting a force on the hidden face are involved, and that it is therefore essential to calculate and test accurately the movement of each of them.

Moreover, the curvature change of the reflective face of the known mirrors is generally limited due to the stroke of the actuators, which is generally reduced due to the accuracy required of them. Moreover, even when the actuators actually manage to impart to the deformable plate a desired whole curvature, the stroke of a certain number of these actuators is necessarily limited as long as the deformable plate keeps this curvature, and the local deformations are hence both less accurate (the accuracy decreasing proportionally to the stroke amplitude used), but also less varied (due to the limitation of said stroke).

These different requirements and constraints drastically limit the possible variety of deformation modes, reduce that way the adjustment accuracy, result in significant inertia (or reaction time) to deformation and make these known mirrors particularly difficult to assemble and adjust. Moreover, the above-mentioned drawbacks increase the cost of these known deformable mirrors, which can generally only be used from their generally flat shape, at rest, without any stress being applied, but also without any possible correction in the event of an assembly or manufacturing error other than by significantly reducing the actuator stroke.

Finally, for certain uses requiring particular changes of curvature, the known mirrors described hereinabove are relatively inaccurate, expensive and cumbersome, and do not offer optimum reliability and reactivity.

DISCLOSURE OF THE INVENTION

The objects assigned to the invention therefore aim to remedy the different drawbacks mentioned hereinabove, and to propose a new reliable adaptive optical device enabling to obtain a great variety of curvatures in a fast and accurate manner, and the manufacturing cost thereof is controlled.

Another object of the invention aims to propose a new adaptive optical device that, while being of simple, cheap and lightweight design, makes it possible to obtain in an accurate and controlled manner a wide variety of deformation amplitudes.

Another object assigned to the invention aims to propose a new adaptive optical device whose implementation is particularly easy and fast.

Another object assigned to the invention aims to propose a new adaptive optical device which is robust, compact and lightweight.

Another object assigned to the invention aims to propose a new adaptive optical device whose structure is simple and reliable.

Another object assigned to the invention aims to propose a new optical device which may be adapted within a wide variety of optical systems.

Another object assigned to the invention aims to propose a new adaptive optical device whose design enables an easy, fast and low-cost integration within an optical system.

Another object assigned to the invention aims to propose a new adaptive optical device whose design lends itself to a wide variety of uses.

Another object assigned to the invention aims to propose a new adaptive optical device suitable for changing in a particularly simple, fast and controlled manner the desired curvature (flatness, concavity or convexity) of its optical surface, in order for example to deform an incident wavefront in a controlled, accurate and fast manner.

Another object assigned to the invention aims to propose a new adaptive optical device whose implementation to change the curvature of its optical surface is particularly easy, while being easy and fast to maintain and adjust.

Moreover, another object assigned to the invention aims to propose a new method for manufacturing an adaptive optical device whose implementation is easy, fast and inexpensive, while making it possible to obtain a particularly reliable, compact, reactive, accurate and robust adaptive optical device.

The objects assigned to the invention are achieved by means of an adaptive optical device comprising at least:

a deformable primary plate, which has an optical surface intended for deforming an incident wavefront by refraction and/or reflection, a plurality of primary actuators, designed to each apply a respective force to said deformable primary plate in order to deform said optical surface, a frame that is fixed with respect to said deformable primary plate, the adaptive optical device being characterized in that it further includes at least:

a deformable secondary plate that supports the primary actuators, a secondary actuator, connected to the frame, and designed to exert, on said deformable secondary plate, a force in a secondary direction of actuation in order to deform it, said secondary direction of actuation and said secondary plate being secant.

The objects assigned to the invention are also achieved by means of a method for manufacturing an adaptive optical device comprising at least:

a primary step of making or providing a deformable primary plate having an optical surface intended for deforming an incident wavefront by refraction and/or reflection, a secondary step of making or providing a deformable secondary plate, a step of positioning a plurality of primary actuators, in such a way, on the one hand, that said primary actuators can each apply a respective force to said deformable primary plate in order to deform said optical surface, and on the other hand, that said primary actuators are supported by said secondary plate, a step of positioning at least one secondary actuator in such a way, on the one hand, that said secondary actuator is connected to a frame, which is fixed with respect to said deformable primary plate, and on the other hand, that said secondary actuator can exert, on said deformable secondary plate, a force in a secondary direction of actuation in order to deform it, said secondary direction of actuation and said secondary plate being secant.

BRIEF DESCRIPTION OF THE DRAWINGS

Other features and advantages of the invention will appear in more detail upon reading of the following description, with reference to the appended drawings, given by way of purely illustrative and non-limiting examples, in which:

FIG. 1 illustrates, in a side view, a schematic diagram of a first embodiment of the adaptive optical device according to the invention.

FIG. 2 illustrates, in a schematic, exploded perspective view, a second embodiment of the adaptive optical device of the invention.

FIG. 3 illustrates, in a schematic side view, the assembled adaptive optical device of FIG. 2.

FIG. 4 illustrates, in a schematic side view, a simplified schematic diagram of the adaptive optical device of FIGS. 2 and 3.

FIG. 5 illustrates, in a front view, the assembled adaptive optical device of FIG. 1.

FIG. 6 illustrates, in a front view, a simplified schematic diagram of a third embodiment of the adaptive optical device of the invention, with the primary and secondary plates here disassembled and placed side-by-side, without frame, this third embodiment being potentially compatible with the first embodiment.

FIG. 7 illustrates, in an exploded perspective view, a fourth embodiment of the adaptive optical device of the invention, without frame.

FIG. 8 illustrates, in a schematic, exploded perspective view, a fifth embodiment of the adaptive optical device of the invention.

BEST WAY TO IMPLEMENT THE INVENTION

The invention relates, according to a first aspect, illustrated in the figures, an adaptive optical device 1. The adaptive optical device 1 is advantageously intended to be used in a system requiring the use of adaptive optics, e.g. a microscopic observation system, an astronomical observation system, a system for visual correction of atmospheric turbulence, an image enlargement or shrinking system, a zoom system, an image distortion system, or an ophthalmologic imaging system.

According to particular embodiment, illustrated in the figures, the adaptive optical device 1 constitutes a deformable mirror. According to another particular embodiment, the adaptive optical device constitutes an adaptive lens. The adaptive optical device 1 is advantageously intended to introduce or to correct an optical aberration in a light wavefront (or ray).

According to a particular embodiment, the adaptive optical device 1 of the invention includes all or part of the adaptive optical device described in the French patent application FR-1909594 of the same applicant (FR-1909594 being the filing number), the content of which is incorporated by way of reference. In the same way, the manufacturing method described hereinafter includes all or part of the manufacturing method described in the patent application FR-1909594 of the same applicant (FR-1909594 being the filing number), the content of which is incorporated herein by way of reference.

According to the invention, the adaptive optical device comprises at least one deformable primary plate 2, which has an optical surface 3 intended for deforming an incident wavefront by refraction and/or reflection. Advantageously, in the absence of external influence, said deformable primary plate 2 has, by construction, a surface that is wholly curved or flat (it can be considered in this latter case that it has a curvature that is zero). For example, said deformable primary plate 2 is slightly rounded, i.e. convex (or slightly concave according to the point of view). Said convexity (or concavity) of said deformable primary plate 2 is preferably low enough, i.e. with a relatively large radius of curvature compared with the dimensions of said deformable primary plate 2, so that the surface of said deformable primary plate 2 (slightly) rounded can be likened, at least locally (i.e. at least over a fraction of the surface area of said deformable primary plate 2) to a flat surface. Therefore, by construction, the optical surface 3, supported by the deformable primary plate 2, and/or integral with the latter, has a "resting" shape, i.e. with no external force applied, which has a certain curvature. This curvature is zero, in the case of a substantially flat shape, or rather small, in the case where the optical surface is provided curved, i.e. it has at rest a curvature with a large radius of curvature. It may be desired to rapidly and accurately change, as well as according to a great number of alternatives, the curvature of the optical surface 3, in particular to change the general profile of the latter, or to correct a constructional imperfection. For example, when an optical surface 3 at rest is supposed to be totally flat by construction, it may have an imperfect flatness, and the adaptive optical device 1 of the invention makes it possible to correct that by imparting a better flatness to the optical surface 3, and that without reducing the variety of possible deformation modes of the latter. On the contrary, the adaptive optical device 1 of the invention 1 advantageously makes it possible to always impart a controlled convex or concave general curvature to the optical surface 3, without reducing the variety of possible deformation modes. These deformation modes are made for example by local deformations of the optical surface 3, by means of primary actuators 4 described hereinafter.

When the adaptive optical device 1 is a mirror, the optical surface 3 is advantageously substantially reflective, i.e. it is then designed to reflect the wavefront. When the device 1 is an adaptive lens, the optical surface 3 allows at least part of the wavefront to pass, by refracting it, i.e. by deflecting it.

According to the invention, the adaptive optical device 1 comprises at least a plurality of primary actuators 4. These latter are designed to each apply a respective force to said deformable primary plate 2 in order to deform said optical surface 3. Advantageously, said deformable primary plate 2 comprises at least, at the opposite of said optical surface 3, a hidden surface 5, on which said primary actuators 4 each exert their respective force. Therefore, the primary actuators 4 are advantageously designed to apply punctual or quasi-punctual forces to said deformable primary plate 2, preferably at the hidden face 5, more preferentially at the opposite of the optical surface 3. Said primary actuators 4 are preferably designed to exert traction and/or pressing forces on the deformable primary plate 2, these forces being more precisely exerted directly on the hidden surface 5 opposite to the optical surface 3, in such a way as to deform the latter in a controlled manner, this deformation of the optical surface 3 thus causing a deformation of the incident wavefront. These forces are preferably localized and/or punctual or quasi-punctual. Preferentially, the primary actuators 4 each have at least one portion connected to said hidden face 5. The primary actuators 4 can be of any type, in particular piezoelectric, magnetic, two-part, mechanical (screw, cylinder or similar, etc.). Said primary actuators 4 are preferably designed to be electrically operated.

According to the invention, the adaptive optical device 1 further comprises a frame 6 that is fixed with respect to said deformable primary plate 2. The frame 6 is advantageously substantially immobile with respect to the moving elements of the device 1, in particular the deformable primary plate 2 and the primary actuators 4.

Therefore, said frame 6 preferably remains immobile when said deformable primary plate 2 is deformed to deform an incident wavefront in a controlled manner. The frame 6 can be made of several parts, preferably fastened to each other, as illustrated in FIGS. 2 to 5, or formed single-piece, i.e. single-block, as illustrated in FIG. 1, any combination being possible. The frame 6 is more generally defined as the support, direct or indirect, of the other elements of the adaptive optical device 1.

The device 1 preferably comprises between 25 and 500 primary actuators 4, e.g. between 50 and 150 primary actuators 4. According to an advantageous alternative, the primary actuators 4 are electrically operated, and according to another alternative, they are operated manually. According to still another alternative, they are designed to be operated in several different manners, e.g. electrically and manually.

According to the invention, the adaptive optical device 1 further comprises at least:
- a deformable secondary plate 7, that supports the primary actuators 4, and
- a secondary actuator 8, connected to the frame 6, and designed to exert, on said deformable secondary plate 7, a force in a secondary direction of actuation S in order to deform it, said secondary direction of actuation S and said secondary plate 7 being secant.

Therefore, said primary actuators 4 are advantageously carried by said deformable secondary plate 7. Said primary actuators 4 are thus preferably attached to said deformable secondary plate 7, which constitutes in a way an "actuator plate" that has the particular feature of being deformable by means of the secondary actuator 8. The primary actuators 4 advantageously connect the secondary plate 7 and the primary plate 2, and can further be attached to the latter. The primary actuators 4 are thus preferably at least in part, and more preferentially totally, between said primary plate 2 and secondary plate 7, more preferably between said hidden face 5 and said deformable secondary plate 7. Therefore, the primary actuators 4 are advantageously not (directly) connected to the frame 6. Preferentially, the deformable secondary plate 7 is thicker and/or more rigid than the deformable primary plate 2. This enables the secondary plate 7 to carry said primary actuator 2 without being significantly deformed by these latter.

Said primary plate 2 and secondary plate 7 are advantageously positioned opposite to each other, preferably substantially parallel to each other. In other words, the primary plate 2 and the secondary plate 7 each extend preferably on either side of a mean plane, said two respective means planes being preferentially substantially parallel or quasi-parallel to each other, with for example a clearance lower than or equal to 10°, advantageously lower than or equal to 7°, more advantageously lower than or equal to 4°. This is advantageously true at rest, whether the curvature of said primary plate 2 is zero (case in which there is flatness at rest) or very low (case in which the primary 2 and secondary 7 plates have a non-zero curvature at rest, but with a large radius of curvature).

The secondary actuator 8 is advantageously attached to the frame 6 and supported by the latter. In other words, the secondary actuator 8 is preferably carried by the frame 6. The adaptive optical device 1 preferentially comprises several secondary actuators 8 as that mentioned hereinabove, and the present description mentions one secondary actuator 8 only for the sake of simplification, wherein what is true for a single secondary actuator 8 is also true for a plurality of secondary actuators 8. Therefore, the adaptive optical device 1, in the particular embodiments illustrated in the figures, comprises a plurality of secondary actuators 8, but it is also conceivable for it to comprise only one secondary actuator 8, in a particular embodiment not illustrated. The term "secondary actuator 8" can thus be replaced, mutatis mutandis, by the the term "secondary actuators 8", and vice versa. The device 1 preferably comprises at least four secondary actuators 8, more preferentially at least six secondary actuators 8, even more preferentially at least eight secondary actuators 8. The primary actuator 8 advantageously connects the frame 6 and the deformable secondary plate 7, and can further be attached to the latter. Therefore, the secondary actuator 8 is advantageously not (directly) attached to the deformable primary plate 2, and is preferably not designed to exert (directly) a force on the latter.

According to a particular embodiment, the frame 6 comprises, as illustrated in FIGS. 2 to 5, a first and a second flanges 9, 10 between which and/or within which are arranged the primary 2 and secondary 7 flanges. The secondary actuator 8 is thus preferably at least in part between said deformable secondary plate 7 and first flange 9 and/or within these latter, more precisely between and/or within said secondary plate 7 and said first flange 8. The secondary actuator 8 is thus advantageously attached to said secondary plate 7 and first flange 9. The device 1 preferably also comprises one or several attachment means 14 making it possible to secure together said first and second flanges 9, 10, said attachment means being for example formed by screws or rivets, or any other suitable means.

The secondary actuator 8 is preferably designed to exert a traction and/or pressing force on the deformable secondary plate 7, preferably in said secondary direction of actuation S. This force can be exerted on either one of the two opposite faces of the secondary plate 7, as illustrated by the embodiments of FIGS. 1 to 4. This force is preferably localized and/or punctual or quasi-punctual on the secondary plate 7, but it advantageously changes the general curvature of the latter or at least a significant portion of said curvature. The secondary actuator 8 may be of any type, in particular piezoelectric, magnetic, two-part, mechanical (screw, cylinder or similar, etc.). The secondary actuator 8 is preferably designed to be actuated electrically and/or manually. The secondary actuator 8 is advantageously distinct from the primary actuators 4, in particular by its nature, its position, as well as its function. The secondary actuator 8 is preferably more powerful and/or greater than each of the primary actuators 4. Preferably, the secondary actuator 8 has greater dimensions than each of said primary actuators 4, and has for example a longer stroke than each of the primary actuators 4. Moreover, the device 1 preferentially comprises less secondary actuator(s) 8 than primary actuators 4. The device 1 comprises for example eight secondary actuators 8.

Therefore, when the secondary actuator 8 (or the secondary actuators 8) deforms the secondary plate 7, which advantageously carries the primary actuators 4, the alignment of these latter is changed. In other words, some of the primary actuators 4 will be moved, due to the fact that they are carried by the deformed secondary plate 7, in the secondary direction of actuation S, therefore changing the curvature of the primary plate 2, in particular at the hidden face 5 and thus also at the optical surface 3, which is thus advantageously deformed in such a way that its curvature is changed. This curvature change is not necessarily local, but can on the contrary advantageously be more global, that is to say that a significant part, preferably a major part, more preferentially the totality of the optical surface 3, has its curvature changed. Such a configuration makes it possible, thanks to the secondary actuators 8 and to the deformable secondary plate 7, to give a particular selected curvature to at least a portion of the primary plate 2, and more precisely to the optical surface 3, the particularly actuators 4, without being activated, communicating at least part of the movement of the secondary actuators 8 deforming the secondary plate 7 to the hidden face 5 and hence to the optical surface 3. More precisely, the device 1 of the invention makes it possible to dynamically change the general curvature of the primary plate 2 via a deformation of the secondary plate 7, while keeping intact or quasi-intact the stroke of the primary actuators 4, which thus keep all their capacities of local deformation of the optical surface 3.

The force, preferably a traction or a pressure, exerted by the secondary actuator 8 on the secondary plate 7, is preferentially directed in the secondary direction of actuation S, which is secant with, that is to say that passes through, the secondary plate 7. In other words, the secondary direction of actuation S is substantially directed towards the deformable secondary plate 7, and is preferably substantially oblique or perpendicular (at least locally) relative to the latter. According to a preferential embodiment, the secondary direction of actuation S is substantially perpendicular to the secondary plate 7, and is in particular substantially perpendicular to a mean plane of the latter, or quasi-perpendicular (with an angle between 87° and 93°, for example). Therefore, the secondary direction of actuation S advantageously passes through the secondary plate 7 (and in particular in the thickness thereof).

Preferentially, the primary actuators 4 are each designed to exert on said deformable primary plate 2 a force in a primary direction of actuation P, which is advantageously substantially parallel to the secondary direction of actuation S. The primary direction of actuation P is preferentially secant with the primary plate 2, and more preferentially secant with the optical surface 3.

Advantageously, said deformable primary plate 2 has at least one peripheral surface 11 extending around and/or adjacent to said optical surface 3. Said optical surface 3 is thus advantageously a substantially central area of the deformable primary plate 2, and more precisely of the face opposite to the hidden face 5 of the deformable primary plate 2. The peripheral surface 11 preferably constitutes one or several portions of the primary plate 2 surrounding at least partly the optical surface 3, which thus advantageously forms a central part of the deformable primary plate 2. Advantageously, said adaptive optical device 1 further comprises at least one external actuator 12, which is connected to the frame 6 and designed to apply a force on said peripheral surface 11 in order to deform said deformable primary plate 2. The external actuator 12 is therefore preferably supported (i.e. carried) by the frame 6, and in particularly fastened to the latter. Preferentially, the external actuator 12 is designed to exert on said deformable primary plate 2 a force, preferably a traction and/or pressing force, in a tertiary direction of actuation T, which is advantageously substantially parallel to the secondary direction of actuation S and/or parallel to the primary direction of actuation P, wherein this force can be exerted on either one of the two opposites faces of the primary plate 2. This force is preferably localized and/or punctual or quasi-punctual on the primary plate 2, but it advantageously changes the general curvature of the latter or at least a significant portion of said curvature. The external actuator 12 can be of any type, in particular piezoelectric, magnetic, two-part, mechanical (screw, cylinder or similar, etc.). The external actuator 12 is preferably designed to be actuated electrically and/or manually. The external actuator 12 is advantageously distinct from the primary actuators 4, in particular by its nature, its position, as well as its function. The external actuator is preferably more powerful and/or greater than each of the primary actuators 4. The external actuator 12 is advantageously distinct from the secondary actuator 8, in particular by its position and its function. Moreover, the external actuator 12 is advantageously substantially similar, by its nature, its dimensions, its power and/or its stroke, to the secondary actuator 8, or even interchangeable with the latter. Such a configuration makes it possible to simplify the manufacturing of the adaptive optical device 1 and to reduce the costs thereof. Preferably, the external actuator 12 has greater dimensions than each of said primary actuators 4, and has for example a longer stroke than each of the primary actuators 4. Moreover, the device 1 preferentially comprises less external actuator(s) 12 than primary actuators 4. The device 1 comprises for example eight external actuators 12.

Preferentially, each external actuator 12 is designed to exert a force on an area of the deformable primary plate 2, in substance the peripheral surface 11, which is preferably aside and/or around the optical surface 3. The external actuator 12 is advantageously not (directly) attached to the deformable secondary plate 7, and is preferably not designed to exert (directly) a force on the latter. The tertiary direction of actuation T is preferentially secant with the primary plate 2, and more preferentially secant with the peripheral surface 11, but preferably not secant with the optical surface 3. The secondary direction of actuation S is preferably not secant with the optical surface 3. The primary direction of actuation P is preferably not secant with the peripheral surface 11. According to a preferential embodiment, the primary direction of actuation P and/or the tertiary direction of actuation T is/are substantially perpendicular to the primary plate 2, and in particular substantially perpendicular to a mean plane of the latter, or quasi-perpendicular (with an angle between 87° and 93°, for example).

The adaptive optical device 1 preferentially comprises several external actuators 12 as that mentioned hereinabove, and the present description mentions one external actuator 12 only for the sake of simplification, wherein what is true for a single external actuator 12 is also true for a plurality of external actuators 12. Therefore, the adaptive optical device 1, in the particular embodiments illustrated in the figures, comprises a plurality of external actuators 12, but it is also conceivable for it to comprise only one external actuator 12, in a particular embodiment not illustrated. The term "external actuator 12" can thus be replaced, mutatis mutandis, by the term "external actuators 12", and vice versa. The device 1 preferably comprises at least four external actuators 12, more preferentially at least six external actuators 12, even more preferentially at least eight external actuators 12. The external actuator 12 advantageously connects the frame 6 and the deformable primary plate 7, and can further be attached to the latter.

When the external actuator 12 (or the external actuators 12) deforms the primary plate 2, which advantageously carries the optical surface 3, the alignment of these latter is advantageously changed. Therefore, without needing to implement the primary actuators 4, the curvature of the primary plate 2, and hence of the optical surface 3, can be changed due to the force exerted by the external actuator 12. Therefore, the curvature of the optical surface 3 may be (previously) changed thanks to the external actuator 12, in such a way that the stroke of the primary actuators 4 is not implemented immediately, so their setting accuracy remains optimal. This makes it possible to perform afterwards, after implementation of the external actuator 12, a finer adjustment, in particular a more localized and controlled deformation, of the optical surface 3, than if the stroke of the primary actuators 4 were harnessed. Moreover, the external actuator 12 makes it possible to provide the primary plate 2 and thus the optical surface 3 with a particular curvature, and that either without harnessing the secondary actuator 8, or in combination with the latter to proceed to a change that is more accurate, more varied and/or according to a greater amplitude of the desired curvature of the optical surface 3.

The external actuator 12 is thus advantageously designed to be implemented in combination with the secondary actuator 8 to change, directly and/or indirectly, the curvature of the optical surface 3, regardless whether this combination occurs concomitantly (or partly concomitantly), the secondary 8 and external 12 actuators being implemented in a same time (or partly in a same time), or successively, the secondary 8 and external 12 actuators being implemented one after the other. Therefore, the external actuator 12 is advantageously designed to follow the deformation of the optical surface 3 induced (indirectly) by the implementation of the secondary actuator 8. Conversely, the secondary actuator 8 can be advantageously designed to follow the deformation of the optical surface 3 induced (indirectly) by the implementation of the secondary actuator 12. Such a configuration makes it possible to keep the primary actuators 4 in an optimum configuration and thus to obtain the best performances possible.

According to a particular alternative, the external actuator 12 is thus preferably at least in part between said deformable secondary plate 7 and first flange 9 and/or within these latter, more precisely between and/or within said primary plate 2 and said first flange 8. The secondary actuator 8 is thus advantageously attached to said primary plate 2 and first flange 7.

According to a particular embodiment, illustrated in particular in FIGS. 2 to 5 and particularly visible in FIG. 4, the primary plate 2 has one or several primary through-holes 13, each secondary actuator 8 being designed to pass through one of the corresponding primary holes 13 so as to be able to exert a force on said secondary plate 7 to deform it, without exerting (directly) a force on said primary plate 2. Therefore, in this latter embodiment, and possibly in other alternatives, the primary plate 2 is advantageously arranged between the secondary plate 7 and the part of the frame 6 to which the secondary plate 8 is connected, this part of the frame 6 advantageously carrying the secondary actuator 8, said part of the frame 6 being for example formed by the first flange 9. Such a configuration makes it possible, in particular when the external actuator 12 is attached to the first flange 9 ((and carried and/or supported by the latter), to mount the secondary 8 and external 12 actuator(s) on a same part of the frame 6, here the first flange 9.

Preferentially, the peripheral surface 11 comprises at least one moving primary part 15 connected at least to said external actuator 12 so that the latter can deform it, in such a way that said moving part 15 transmits a deformation force to said optical surface 3, the peripheral surface 11 further comprising at least one respective fixed primary part 16 that is fixedly attached to said frame 6 to be immobilized with respect to the latter, e.g. using an attachment means such as glue (FIG. 1) or one or several screws (FIGS. 2-3). Preferentially, the secondary plate 7 comprises at least one moving secondary part 17 connected at least to said secondary actuator 8 so that the latter can deform it, in such a way that said moving secondary part 17 transmits a deformation force to said optical surface 3 via said primary actuators 4 (without using their stroke, i.e. without actuating them), the secondary plate 7 further comprising at least one respective fixed secondary part 18 that is fixedly attached to said frame 6 to be immobilized with respect to the latter, e.g. using an attachment means such as glue (FIG. 1) or one or several screws (FIGS. 2-3). The fixed secondary part 18 comprises for example an edge of the secondary plate 7. The fixed primary part 16 comprises for example an edge of the primary plate 2.

According to a particular embodiment, illustrated in particular in FIGS. 2 and 7, said primary and secondary plates 2, 7 have generally substantially similar shapes, and for example they have respective star shapes, with the same number of branches, for example at least four branches, according to another example at least six branches, and according to still another example, at least eight branches, or according to still another example, exactly eight branches. According to an alternative, illustrated in particular in FIG. 6, said primary and secondary plates 2, 7 each have a substantially polygonal general shape, and in particular a substantially rectangular or square shape. FIG. 6 illustrates the latter alternative, with the adaptive optical device disassembled and not complete (frame 6 not illustrated), the primary plate 2 on the left and connected to four external actuators 12, the secondary plate 7 on the right and connected to four secondary actuators 8 while carrying the primary actuators 4, the plates 2, 7 being viewed in front view, before being stacked, for example, primary plate 2 on secondary plate 7, with the same orientation.

According to a particular embodiment, illustrated in particular in FIG. 7, said primary and secondary plates 2, 7 have substantially different general shapes, and for example the primary plate has a star shape (with eight branches according to an alternative) whereas the secondary plate 7 has a substantially circular shape, in particular round.

According to a particular embodiment, and as illustrated in FIGS. 2 and 7, the primary plate 2 comprises primary tabs 19 forming at least in part the peripheral surface 11, and preferably fixedly attached to the optical surface 3. Each primary tab 19 has for example the shape of a part of thin, deformable plate, which is advantageously deformed and/or moved, for example bent, under the action of an external force exerted on its surface, in particular a force exerted by the external actuator 12. The deformable primary plate 2 and/or the optical surface 3 advantageously comprises a primary geometric centre. Preferentially, each primary tab 19 extends, from said optical surface 3, radially with respect to said primary geometric centre, for example towards the outside, as illustrated in particular in FIGS. 2 and 7. Advantageously, as illustrated in FIG. 2, said primary tabs 19 are uniformly angularly distributed around said primary geometric centre. Each primary tab 19 forms for example one of the branches of the above-mentioned primary plate 2. Said fixed primary part 16 comprises for example a primary external end (at the opposite of the optical surface 3) of at least one of said primary tabs 19, whereas said moving primary part 15 comprises for example at least one intermediate part of said primary tab 19 located between said optical surface 3 and said primary external end.

Optionally, the peripheral surface 11 further comprises a primary connection part 23, designed to connect the respective end of two adjacent primary tabs 19. The primary connection part 23, advantageously located remote from the optical surface 3, thus connects together said two primary tabs 19, and it can possibly be considered that said primary connection part 23 belongs to the two primary tabs 19. In such a configuration, at least one of said external actuator(s) 12 is designed to exert a force on said primary connection part 23 in order to deform it and to thus induce a deformation in the rest of the primary plate 2. Said primary connection part 23 advantageously forms either said moving primary part 15 (or at least one of said moving primary parts 15), which makes it possible to use one external actuator 12 instead of two, or said fixed primary part 16 (or at least one of said fixed primary parts 16), which makes it possible to use only one attachment means for attaching the fixed primary part 16 to the frame 6 (e.g. one screw instead of two, or less of this means if the latter is glue). Also optionally, the secondary plate 7 further comprises a secondary connection part (not illustrated) designed to connect the respective end of two adjacent secondary tabs 20. The secondary connection part, advantageously located remote from the primary actuators 4, thus connects together said two primary tabs 20, and it can possibly be considered that said secondary connection part belongs to the two secondary tabs 20. In such a configuration, at least one of said secondary actuator(s) 8 is designed to exert a force on said secondary connection part in order to deform it and to thus induce a deformation in the rest of the primary plate 2. Said secondary connection part advantageously forms either said moving secondary part 17 (or at least one of said moving secondary parts 17), which makes it possible to use one secondary actuator 8 instead of two, or said fixed secondary part 18 (or at least one of said fixed secondary parts 18), which makes it possible to use only one attachment means for attaching the fixed secondary part 18 to the frame 6 (e.g. one screw instead of two, or less of this means if the latter is glue).

According to a particular embodiment, compatible with the preceding one, and as illustrated in FIG. 2, the secondary plate 7 comprises secondary tabs 20 extending from a portion of the secondary plate 7 that supports said primary actuators 4. Each secondary tab 20 has for example the shape of a part of thin, deformable plate, which is advantageously deformed and/or moved, for example bent, under the action of an external force exerted on its surface, in particular a force exerted by the secondary actuator 8. The deformable secondary plate 7 advantageously comprises a secondary geometric centre. Preferentially, each secondary tab 20 extends, from the portion of the secondary plate 7, supporting said primary actuators 4, radially with respect to said secondary geometric centre, for example towards the outside, as illustrated in particular in FIG. 2. Advantageously, as illustrated in FIG. 2, said secondary tabs 20 are uniformly angularly distributed around said secondary geometric centre. Each secondary tab 20 forms for example one of the branches of the above-mentioned secondary plate 7. Said fixed secondary part 18 comprises for example a secondary external end (at the opposite of the primary actuators 4) of at least one of said primary tabs 19, whereas said moving secondary part 17 comprises for example at least one intermediate part of said secondary tab 20 located between said primary actuators 4 and said secondary external end. Advantageously, each primary tab 19 is positioned opposite one of said corresponding secondary tabs 20.

Said primary 2 and secondary 7 plates, although deformable under the effect of actuators, preferably each have their own mechanical resistance.

Figure 8:
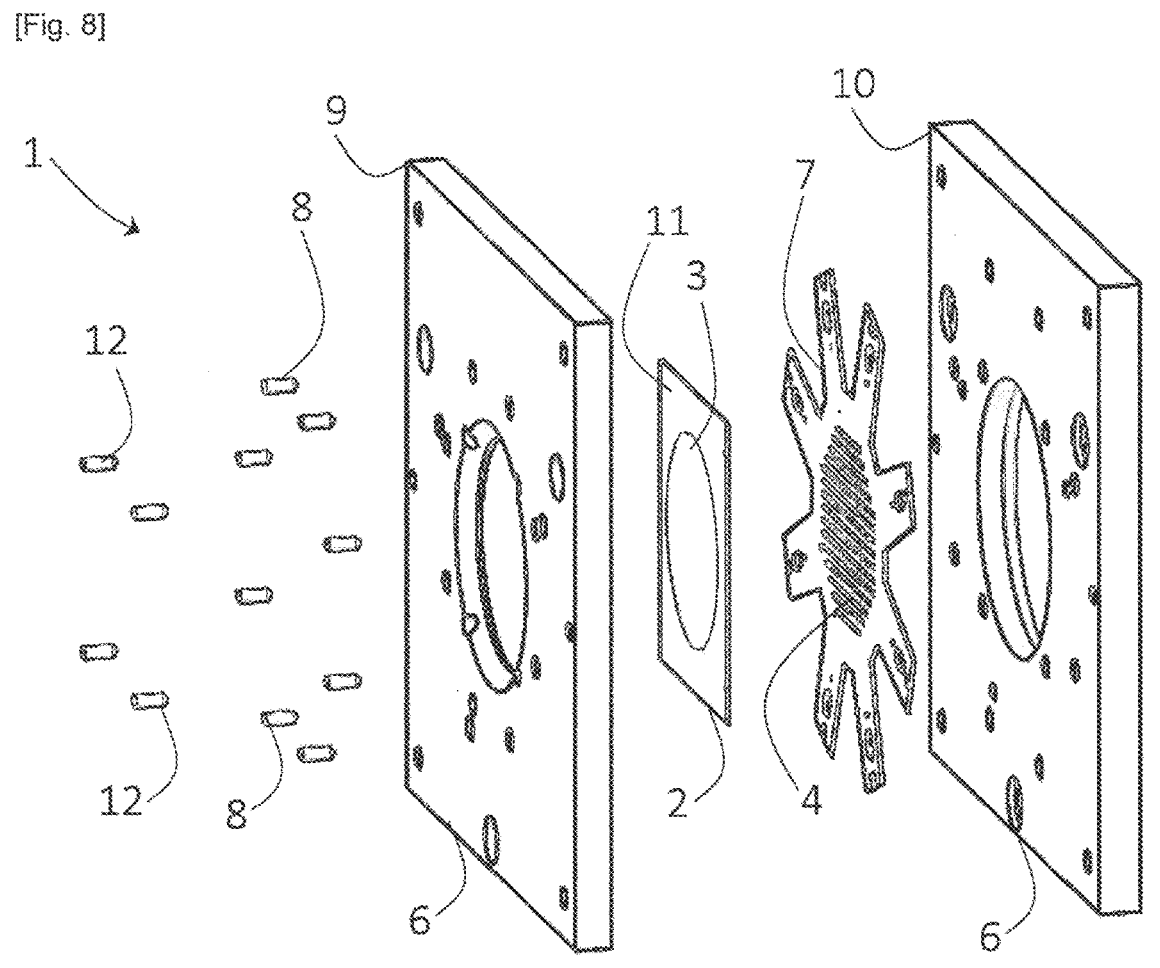

FIG. 8 illustrates an adaptive optical device 1 according to a fifth embodiment of the invention, which is very similar to that illustrated in FIG. 2, but which is different from the latter in that the deformable primary plate 2 has not a star shape but a square shape, whereas the deformable secondary plate 7 keeps a star shape. The optical surface 3 has, in the device 1 illustrated in FIG. 8, a circular shape. It is therefore possible to make a great number of different configurations of adaptive optical devices 1 according to the invention, for example according to the desired deformations for the optical surface 3.

The invention relates, according to a second aspect, a method for manufacturing an adaptive optical device 1. The method is preferentially implemented to manufacture the adaptive optical device 1 described hereinabove and hereinafter. The above description, as well as the following one, relating to the adaptive optical device 1 thus preferably also applies to the manufacturing method according to the invention, and conversely, the following description relating to the manufacturing method preferentially also applies to the adaptive optical device 1 according to the invention.

Therefore, according to the second aspect of the invention, the manufacturing method includes at least:

a primary step of making or providing a deformable primary plate 2 having an optical surface 3 intended for deforming an incident wavefront by refraction and/or reflection, a secondary step of making or providing a deformable secondary plate 7, a step of positioning a plurality of primary actuators 4, in such a way, on the one hand, that said primary actuators 4 can each apply a respective force to said deformable primary plate 2 in order to deform said optical surface 3, and on the other hand, that said primary actuators 4 are supported by said secondary plate 7, a step of positioning at least one secondary actuator 8 in such a way, on the one hand, that said secondary actuator 8 is connected to a frame 6, which is fixed with respect to said deformable primary plate 2, and on the other hand, that said secondary actuator 8 can exert, on said deformable secondary plate 7, a force in a secondary direction of actuation S in order to deform it, said secondary direction of actuation S and said secondary plate 7 being secant.

According to a particular embodiment, the method of manufacturing further comprises at least one of the following steps:

a step of changing the curvature of said secondary plate 7 by exerting, using the secondary actuator 8, a force on said secondary plate 7, in such a way as to impart to the latter a changed curvature configuration, a step of secondary attachment, whereas said secondary plate 7 is in the changed curvature configuration, of said secondary plate 7 and/or an edge of said primary plate 2, e.g. using glue or screws, on the frame 6.

Said secondary attachment step comprises for example the gluing or the screwing to the frame 6 of a fixed secondary part 18 of the secondary plate 7, and more precisely the gluing or the screwing of the frame 6 of a part of one or several secondary tabs 20 of the secondary plate 7.

In this latter particular embodiment, the manufacturing method possibly comprises a step of unfastening the secondary actuator 8 from the frame 6. Therefore, said secondary actuator 8 is preferentially removable, i.e. it is designed to be unfastenable, preferably easily, from said frame 6. Such a configuration makes it possible to lighten and simplify the final device 1, while providing the optical surface 3 with a changed curvature configuration of the secondary plate 7, wherein this change of curvature is provided from the secondary plate 7 having a changed curvature to the primary plate 2 via said primary actuators 4, without these latter have to be actuated, because said primary actuators 4 advantageously connect said primary 2 and secondary 7 plates.

According to a particular embodiment, compatible with the preceding one, the method further comprises a step of positioning at least one external actuator 12, in such a way that, on the one hand, it is connected to the frame 6, and on the other hand, it can apply a force on said peripheral surface 11 in order to deform said deformable primary plate 2.

According to a particular embodiment, compatible with the preceding ones, the manufacturing method further comprises at least the following successive steps:

a step of changing the curvature of said primary plate 2 by exerting, using the external actuator 12, a force on said secondary plate 2, in such a way as to impart to the latter a changed curvature configuration, a step of primary attachment, whereas said primary plate 2 is in the changed curvature configuration, of an attaching portion of said primary plate 2, e.g. using glue or screws, on the frame 6.

In this latter particular embodiment, the manufacturing method possibly comprises a step of unfastening the secondary actuator 12 from the frame 6. Therefore, said external actuator 12 is, in this latter particular embodiment, preferentially removable, i.e. it is designed to be unfastenable, preferably easily, from said frame 6. Such a configuration makes it possible to lighten and simplify the final device 1, while providing the optical surface 3 with a chosen changed curvature via a change of curvature of the primary plate 2 initially imparted by the external actuator 12 (and the second plate 22), without the primary actuators 4 have to be actuated, so that these latter keep their stroke and their accuracy to perform subsequent localized deformations.

According to a particular embodiment, compatible with the preceding ones, the method for manufacturing an adaptive optical device comprises a step of fastening a first and a second plates 21, 22, distinct from each other, in order to form said primary plate 2, said first plate 21 forming at least the optical surface 3 whereas said second plate 22 forms at least said peripheral surface 11. Such a configuration is illustrated in a non-limiting way in FIG. 7. The first plate 21 is for example substantially circular, in particular round, and has to be fastened, e.g. by gluing or screwing, to the centre of the second plate 22. The latter comprises for example the primary tabs 19.

Therefore, according to the preceding embodiment, the primary plate 2 is formed of a first and a second plates 21, 22, distinct from each other but fastened to each other, e.g. by gluing or screwing, said first plate 21 forming at least the optical surface 3 whereas said second plate 22 forms at least said peripheral surface 11. As an alternative, the secondary plate 7 is single-piece, i.e. single-block, and the optical surface 3 is for example formed directly on it, by chemical and/or mechanical treatment (polishing, etc.).

Advantageously, during said primary attachment step, said attaching portion is formed either by part of said second plate 22, e.g. a fixed secondary part 18 of the peripheral surface 11, or by an edge of said first plate 21. Therefore, said primary attachment step comprises for example the gluing or the screwing to the frame 6 of a fixed primary part 16 of the peripheral surface 11, and more precisely the gluing or the screwing of the frame 6 of part of one or several primary tabs 19 of the peripheral surface 11.

In this latter particular embodiment, the manufacturing method possibly comprises a step of unfastening said first and second plates 21, 22. Advantageously, in this latter particular embodiment, said second plate 22 is therefore removable, and is in particular reversibly attached to said first plate 21, that is to say that said first and second plates 21, 22 are designed to be unfastenable, preferably easily, from each other. Such a configuration makes it possible to lighten and simplify the final device 1, while providing the optical surface 3 with a changed curvature as described hereinabove, but this time via the second plate 22 that is first deformed thanks to the external actuator 12, and that will thus impart a changed curvature configuration to the first plate 21 (and hence to the optical surface 3), because the first and second plates 21, 22 are then attached to each other, said second plate 22 being then removed after the edges of the first plate 21 have been attached to the frame 6 in such a way that the optical surface 3 keeps the changed curvature configuration.

The adaptive optical device 1 of the invention, preferably obtained via the manufacturing method of the invention, makes it possible to perform extremely accurate deformation operations over a wide range of curvature amplitudes of an optical surface, such a configuration offering a wide variety of different incident wavefront deformations, and being easily adaptable for a great number of applications.

POSSIBILITY OF INDUSTRIAL APPLICATION

The invention finds its industrial application in the design, manufacture and use of adaptive optical devices.

The invention claimed is:

1. An adaptive optical device comprising at least:
   a deformable primary plate, which has an optical surface intended for deforming an incident wavefront by refraction and/or reflection,
   a plurality of primary actuators, designed to each apply a respective force in a primary direction of actuation to said deformable primary plate in order to deform said optical surface,
   a frame that is fixed with respect to said deformable primary plate,
   wherein the adaptive optical device further includes at least:
   a deformable secondary plate that supports the plurality of primary actuators,
   at least one secondary actuator, connected to the frame, and designed to exert, on said deformable secondary plate, a force in a secondary direction of actuation in order to deform said deformable secondary plate, said secondary direction of actuation being secant to a main extension plane of said secondary plate, said deformable primary plate having at least one peripheral surface extending around and/or adjacent to said optical surface, said adaptive optical device further comprising a plurality of external actuators connecting the frame and the at least one peripheral surface of the deformable primary plate and each of the plurality of external actuators designed to apply a punctual force on said at least one peripheral surface in order to deform said deformable primary plate, the plurality of external actuators being distinct from said at least one secondary actuator.

2. The adaptive optical device according to claim 1, wherein said deformable primary plate comprises at least, at the opposite of said optical surface, a hidden surface, on which said plurality of primary actuators each exert their respective force.

3. The adaptive optical device according to claim 1, wherein the at least one peripheral surface comprises at least one moving primary part connected at least to one of said plurality of external actuators so that the latter can deform it, in such a way that said moving primary part transmits a deformation force to said optical surface, the at least one peripheral surface further comprising at least one respective fixed primary part that is fixedly attached to said frame to be immobilized with respect to the latter.

4. The adaptive optical device according to claim 1, wherein said plurality of external actuators are removable.

5. The adaptive optical device according to claim 1, wherein the deformable primary plate is formed of a first and a second plates distinct from each other but fastened to each other, said first plate forming at least the optical surface whereas said second plate forms at least said at least one peripheral surface.

6. The adaptive optical device according to claim 5, wherein said second plate is removable, and in particular reversibly attached to said first plate.

7. The adaptive optical device according to claim 1, wherein said at least one secondary actuator is removable.

8. The adaptive optical device according to claim 1, wherein said deformable primary plate and said deformable secondary plate have substantially similar shapes.

9. The adaptive optical device according to claim 1, wherein said deformable secondary plate comprises a movable part disposed so that, in projection on a main extension plane of the optical surface, the movable part extends around and/or next to the optical surface, said at least one secondary actuator being connected to said movable part, and wherein said at least one secondary actuator and the plurality of external actuators being, in projection on the main extension plane of the optical surface, arranged around and/or next to the plurality of primary actuators.

10. A method for manufacturing an adaptive optical device including at least:
    a primary step of making or providing a deformable primary plate having an optical surface intended for deforming an incident wavefront by refraction and/or reflection,
    a secondary step of making or providing a deformable secondary plate,
    a step of positioning a plurality of primary actuators in such a way, on the one hand, that said plurality of primary actuators can each apply a respective force in a primary direction of actuation to said deformable primary plate in order to deform said optical surface, and on the other hand, that said plurality of primary actuators are supported by said deformable secondary plate,
    a step of positioning at least one secondary actuator in such a way, on the one hand, that said at least one secondary actuator is connected to a frame, which is fixed with respect to said deformable primary plate, and on the other hand, that said at least one secondary actuator can exert, on said deformable secondary plate, a force in a secondary direction of actuation in order to deform said deformable secondary plate, said secondary direction of actuation being secant to a main extension plane of said deformable secondary plate, said deformable primary plate having at least one peripheral surface extending around and/or adjacent to said optical surface, the method further comprising a step of positioning a plurality of external actuators, in such a way that the plurality of external actuators connect the frame and the at least one peripheral surface of the deformable primary plate, the plurality of external actuators being configured to each apply a punctual force on said at least one peripheral surface in order to deform said deformable primary plate, the plurality of external actuators being distinct from said at least one secondary actuator.

11. The method for manufacturing an adaptive optical device according to claim 10, wherein the method further comprises at least the following successive steps:
    said at least one secondary actuator being connected to the frame,
    a step of changing a curvature of said deformable secondary plate by exerting, using said at least one secondary actuator, a force on said deformable secondary plate in such a way as to impart to the latter a changed curvature configuration, a step of secondary attachment, said deformable secondary plate being in the changed curvature configuration, of said deformable secondary plate and/or an edge of said deformable primary plate on the frame, a step of unfastening said at least one secondary actuator from the frame.

12. The method for manufacturing an adaptive optical device according to claim 11, wherein the method further comprises at least the following successive steps:

a step of changing a curvature of said deformable primary plate by exerting, using the plurality of external actuators, a force on said deformable primary plate, in such a way as to impart to the latter a changed curvature configuration, a step of primary attachment, said deformable primary plate being in the changed curvature configuration, of an attaching portion of said deformable primary plate, on the frame.

13. The method for manufacturing an adaptive optical device according to claim 12, wherein the method further comprises a step of unfastening the plurality of external actuators from the frame.

14. The method for manufacturing an adaptive optical device according to claim 12, wherein, during said primary attachment step, said attaching portion is formed either by part of said second plate, or by an edge of said first plate.

15. The method for manufacturing an adaptive optical device according to claim 11, wherein the method further comprises a step of fastening a first and a second plates distinct from each, in order to form said deformable primary plate, said first plate forming at least the optical surface whereas said second plate forms at least said at least one peripheral surface.

16. The method for manufacturing an adaptive optical device according to claim 15, wherein the method further comprises a step of unfastening said first and second plates.

17. The method for manufacturing an adaptive optical device, according to claim 10, wherein, said deformable secondary plate comprising a movable part; the step of positioning of said at least one secondary actuator is such that said at least one secondary actuator is connected to said movable part and, in projection on a main extension plane of the optical surface, the movable part extends around and/or next to the optical surface, and wherein the step of positioning a plurality of external actuators is configured, together with the positioning of said at least one secondary actuator, so that said at least one secondary actuator and the plurality of external actuators are, in projection on the main extension plane of the optical surface, arranged around and/or next to the plurality of primary actuators.

* * * * *